United States Patent [19]

Wood

[11] Patent Number: 4,581,085

[45] Date of Patent: Apr. 8, 1986

[54] LINING OF PIPELINES OR PASSAGEWAYS

[75] Inventor: Eric Wood, Wellinborough, United Kingdom

[73] Assignee: Insituform International N.V., Netherlands Antilles

[21] Appl. No.: 537,386

[22] PCT Filed: Jan. 31, 1983

[86] PCT No.: PCT/GB83/00019
§ 371 Date: Sep. 7, 1983
§ 102(e) Date: Sep. 7, 1983

[87] PCT Pub. No.: WO83/02748
PCT Pub. Date: Aug. 18, 1983

[30] Foreign Application Priority Data

Feb. 5, 1982 [GB] United Kingdom ............... 8203303

[51] Int. Cl.⁴ .................................... B32B 31/12
[52] U.S. Cl. .................................... 156/156; 138/97;
156/287; 156/294; 156/295
[58] Field of Search .................... 138/93, 97, 141;
156/156, 285, 294, 295, 287

[56] References Cited

U.S. PATENT DOCUMENTS

| | | | |
|---|---|---|---|
| 2,794,758 | 6/1957 | Harper et al. | 156/287 X |
| 3,132,062 | 5/1964 | Lang et al. | 156/287 |
| 4,064,211 | 12/1977 | Wood | 156/287 X |
| 4,135,958 | 1/1979 | Wood | 156/287 X |
| 4,350,548 | 9/1982 | Zenbayashi et al. | 156/156 |

FOREIGN PATENT DOCUMENTS

| | | | |
|---|---|---|---|
| 0080422 | 7/1981 | Japan | 156/294 |
| 1569675 | 6/1980 | United Kingdom . | |
| 490681 | 2/1976 | U.S.S.R. . | |

OTHER PUBLICATIONS

Two 1977 articles from M. Chimia, pp. 99 & 101.

*Primary Examiner*—Robert A. Dawson
*Attorney, Agent, or Firm*—Fred Philpitt

[57] ABSTRACT.

The invention provides that a tubular lining, suitable comprising an inner felt layer soaked in curable synthetic resin, and an outer impermeable layer, so everted into a pipeline or passageway by means of a gaseous fluid medium which holds the lining against the passageway surface, a pull tape or card which is inside the lining and emerges from the everting face so that tension can be applied thereto, and a lubricating medium inside the everted portion to enable the inwardly travelling uneverted portion to slide over the previously everted portion.

7 Claims, 2 Drawing Figures

LINING OF PIPELINES OR PASSAGEWAYS

This invention relates to the lining of pipelines or passageways, including underground sewers and pipes, all collectively referred to herein as passageways.

There is already known and now widely practised a method of lining passageways, especially underground passageways, which extend substantially horizontally, wherein a lining tube of a flexible nature is everted into and along the passageway by means of a fluid, specifically a liquid of a specific gravity which is matched to that of the inwardly travelling lining tube, so that the lining tube is buoyantly supported by the everting liquid. This is of importance because the lining tube comprises or includes a resin absorbent layer which is impregnated with a curable synthetic resin. It is therefore of substantial weight and its support as it travels inwardly along the passageway is necessary, according to the known method.

When the lining is in position, when in the passageway, the resin is cured or caused to cure so that the lining becomes in fact a rigid resin pipe which is free standing.

It is usual to use water as the everting liquid, but in many circumstances a ready supply of water is not always available, and as the process may involve lining considerable lengths of passageway, in some cases large quantities of water may be required.

The present invention contemplates an alternative method for the placement of a liner, such as that described above, wherein the use of large amounts of water is not necessary, and in accordance with the present invention the passageway is lined by everting a flexible lining tube into the passageway, wherein a pressure medium keeping the everted lining on the passageway surface is gaseous in nature, and in addition, along the inside of the everting lining tube is a pull cord, wire, tape or the like, on which a tension force can be applied to assist the eversion process.

In order to assist the sliding of the lining along the inside of the passageway, there may be used a lubricating medium such as a lubricating soap or oil, this aspect of the invention being useful for applications wherein the lining tube is of or includes a resin absorbent layer which is impregnated with a curable synthetic resin.

In the preferred method of operation, air is used to keep the lining tube on the passageway surface and to assist in everting the lining tube along the passageway, and the pull cord or tape has a tension applied thereto to assist in the eversion.

In the passageway, downstream of the everting face, a vacuum may be applied in order further to assist the eversion.

When the lining includes a curable resin as abovementioned, upon completion of the eversion, the everted lining may be filled with hot air in order to initiate or effect the curing of the resin.

The cord or tape may be applied to the lining tube interior in any suitable manner, so that it will emerge from the everting face, and detach from the tube at the everting face so that tension can be applied thereto in order to assist the eversion.

It may well be that the pull cord or tape in fact performs the eversion, the gaseous medium serving simply to keep the everted portion of the tube inflated.

An embodiment of the invention will now be described, by way of example, with reference to the accompanying diagrammatic drawings, wherein.

Figure 1:
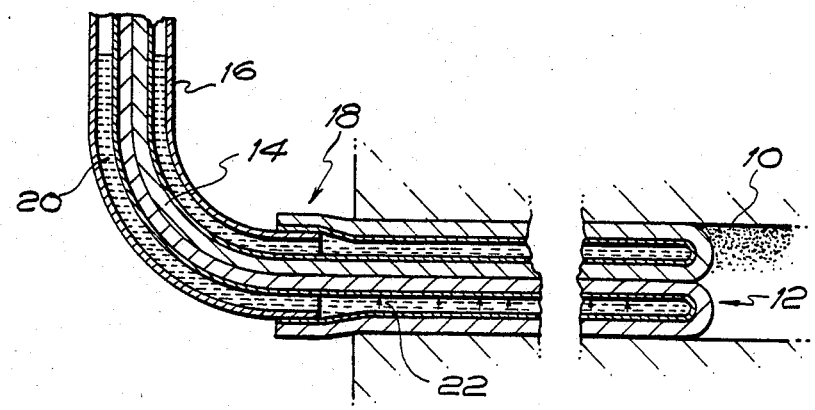
FIG. 1 is a diagrammatic sectional elevation showing how the lining process according to the known method is performed.

Referring to the drawings, in FIG. 1 there is shown an underground passageway 10 which is in the process of being lined according to the known method by means of lining tube 12. The lining tube 12 is flexible in nature and comprises, before eversion, an inner tube 14 of a synthetic felt which is thoroughly impregnated with a curable resin (for example epoxy or polyester resin), and the outer surface of the felt is covered by a fluid impermeable membrane. One end 18 of the flexible lining tube 12 is turned back upon itself and anchored at one end of the passageway to a feed pipe 16, and then a liquid 20 is used to evert the tube into and along the passageway as shown in FIG. 1, the everted portion of the tube being held by fluid pressure against the passageway surface by the pressure of the everting liquid 20. The liquid 20 is of such specific gravity as related to that of the impregnated flexible tube, that the tube is supported with neutral buoyancy by the liquid as it travels along the inside of the passageway, as indicated by the arrows 22. When the eversion has been completed, the resin soaking the felt is cured or caused to cure so that there results a rigid pipe lining the passageway.

The above process is satisfactorily performed in many countries of the world.

Figure 2:
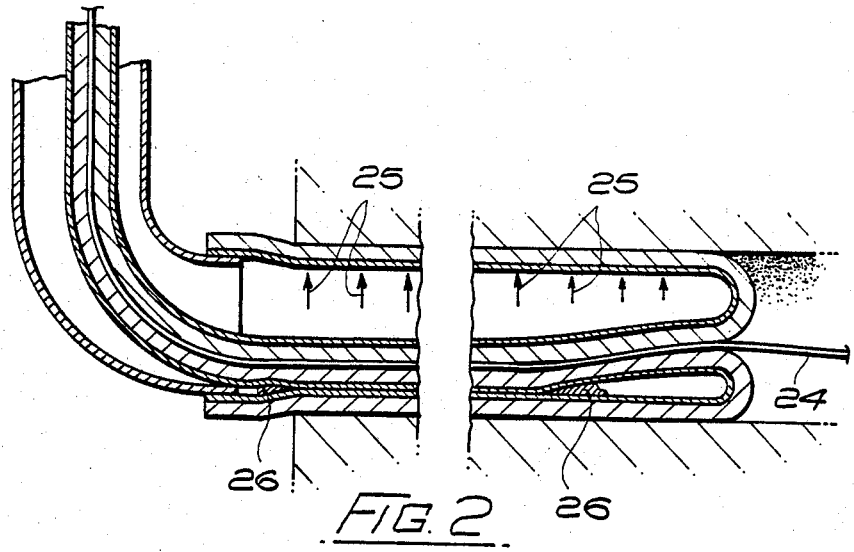
FIG. 2 shows how the process according to the present invention is performed.

In accordance with the process according to this invention, which does not require the utilisation of a supply of liquid, a gaseous medium, e.g. air is used to maintain the everted portion of the lining tube inflated against the surface to be lined as indicated by arrows 25, and, as shown in FIG. 2, during the eversion process the inwardly travelling portion of the liner 12 will in fact rest upon that portion of the lining 12 which lines the bottom of the passageway. In accordance with the method of the invention however, the lining has in addition and located internally thereof prior to eversion, a pull cord or tape 24 which extends along the interior of the passageway and emerges from the everting face of the lining. Tension on this tape by any suitable means such as by hand or a winch device, assists or effects the eversion process enabling the lining to be everted satisfactorily into position, lining the passageway. To assist the slipping of the inwardly travelling portion of the lining, there may be a lubricating medium such as soap or oil in the interior of the everted portion of the lining, as indicated by numeral 26. The lubricant is introduced after the initial eversion commences and as much as is necessary is introduced to ensure complete eversion.

The tape is connected to one end of the lining, the end opposite to that at which the eversion starts, and as the eversion proceeds, so the tape spews out of the everting face. The friction between the portion of the tape in the lining and the material of the lining is sufficient to ensure that tension applied to the tape is translated into a pull on the uneverted part of the lining, assisting it to evert.

This method of the invention can be utilised when there is no readily available supply of everting liquid.

The tape or cord can also be tensioned at various points and to various degrees in the eversion process to assist the eversion to continue, when for example the everting liner sticks in a particular location during the eversion process.

This invention has best application to the use of flexible lining tubes which are impregnated with synthetic resin, but it can also be used where other lining tubes, such as tubes of plastics material film, are used.

I claim:

1. In the method of lining a passageway by everting a flexible lining tube that includes a resin absorbent material soaked with a curable synthetic resin into the passageway with the aid of pressure medium, the improvement which comprises
    (a) using a gaseous material as the pressure medium,
    (b) supporting the inwardly travelling uneverted portion of the tube on the lower surface of the previously everted portion of the tube as the uneverted portion of the tube moves through the previously everted portion of the tube, and
    (c) facilitating the movement of the uneverted portion of the tube over the lower surface of the previously everted portion of the tube by providing a thin layer of a lubricant between the surfaces of the everted portions and the surfaces of the uneverted portions that are in moving surface contact with each other.

2. The method according to claim 1 wherein the eversion of the tube in the passageway is assisted by a pulling force applied to the uneverted portion of the tube.

3. A method according to claim 1 wherein said gaseous medium is air.

4. A method according to claim 2 wherein said gaseous medium is air.

5. A method according to claim 1 wherein upon completion of the eversion, the everted lining is filled with hot air in order to effect curing of the resin.

6. A method according to claim 2 wherein upon completion of the eversion, the everted lining is filled with hot air in order to effect curing of the resin.

7. A method according to claim 5 wherein said gaseous medium is air.

* * * * *